Figure 1:
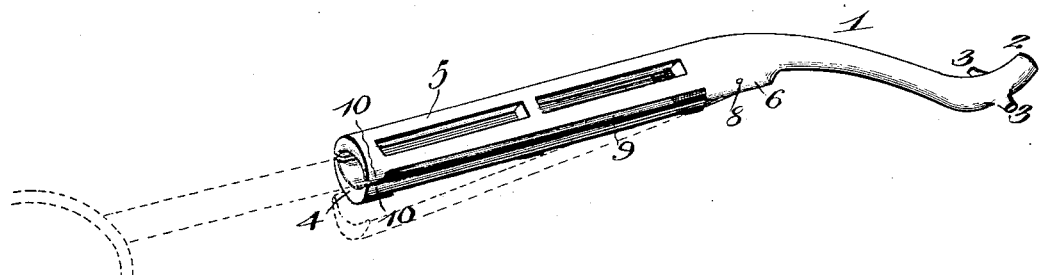

No. 625,312. Patented May 23, 1899.
H. F. AUSTIN.
POT AND LID LIFTER.
(Application filed Aug. 10, 1898.)
(No Model.)

Witnesses

Henry F. Austin, Inventor.
By his Attorneys.

UNITED STATES PATENT OFFICE.

HENRY F. AUSTIN, OF SCOTT'S HILL, TENNESSEE.

POT AND LID LIFTER.

SPECIFICATION forming part of Letters Patent No. 625,312, dated May 23, 1899.

Application filed August 10, 1898. Serial No. 688,272. (No model.)

*To all whom it may concern:*

Be it known that I, HENRY F. AUSTIN, a citizen of the United States, residing at Scott's Hill, in the county of Henderson and State of Tennessee, have invented a new and useful Pot and Lid Lifter, of which the following is a specification.

This invention relates to pot and lid lifters; and the object thereof is to provide the handle of an ordinary lid-lifter with a hinged section capable of retaining the handle of a pot or pan between said hinged section and the stationary section of the lifter-handle.

The invention is applicable to skillets and pans having the usual rod-like handle or to a pot having a bail-handle.

Further objects and advantages of my improvements will be hereinafter more fully described, shown in the drawings, and particularly pointed out in the claims.

Figure 2:
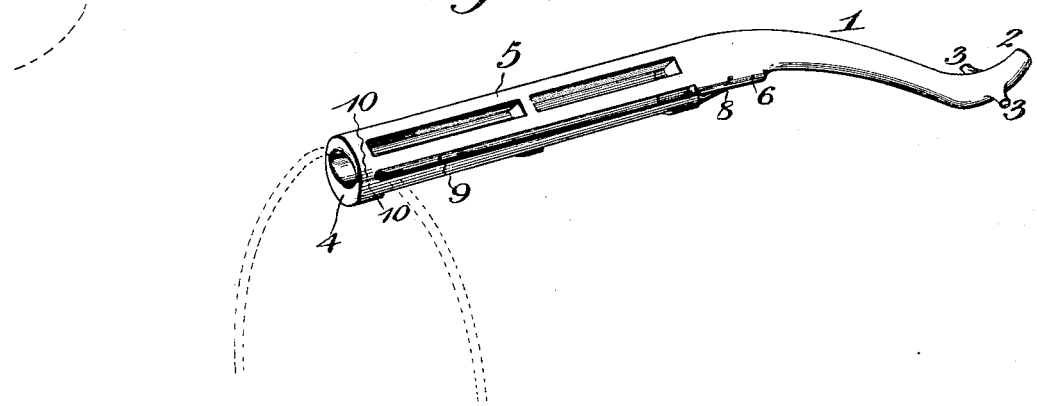
Figure 3:
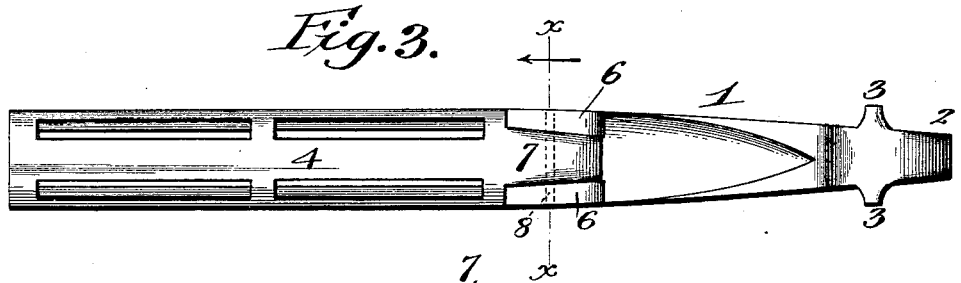
Figure 4:
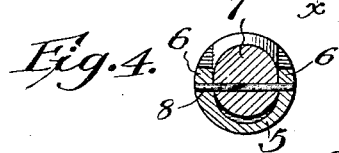

In the drawings, Figure 1 is a perspective view of a lid-lifter provided with my improvements. Fig. 2 is a similar view applied to the bail of a pot. Fig. 3 is an underneath plan view of the lifter. Fig. 4 is a transverse sectional view taken on the line $x\ x$, Fig. 3.

Corresponding parts in the several figures are denoted by like characters of reference.

Referring to the drawings, 1 designates the ordinary form of lifter, having the usual nose 2 and ears 3 at each side thereof and adapted to be used in the ordinary manner to lift the lids from a stove.

The present invention consists in providing the hinged section 4, which, in conjunction with the stationary section 5, forms the handgrasp of the lifter. The stationary handle-section is concaved upon its lower side and is provided with a pair of depending flanges 6 at its forward end. The hinged section is provided with a head 7 at its forward end and is pivoted or hinged between and to the flanges 6 by means of a pin 8 or in any preferred or suitable manner. Both of the sections are approximately semicircular in cross-section, and therefore form a circular handle when closed together. Each section is of skeleton form, as shown, to provide as light an implement as possible. The side edges of the sections do not meet when closed, but provide longitudinal slots 9, which are closed at their rear ends by circumferential lugs 10, formed at the ends of each section and at each side thereof. These slots form, in conjunction with the concaved faces of the handle, a slot opening out at each side of the handle to receive the bail of a cooking utensil.

As illustrated in Fig. 1, the lifter is applied to a skillet, showing the handle thereof received between the sections 4 and 5 of the lifter, which on being grasped by the hand clamp the handle of the skillet therebetween to lift the same without burning the hand of the operator.

To use the device in connection with the bail of a pot or similar utensil, I have illustrated the same in Fig. 2. In this view the bail is received between the sections 4 and 5 and in the slots 9, and when the sections are closed together by the grip of the hand the circumferential lugs 10 close the end of the slot and prevent the bail from slipping therefrom.

The present combination and arrangement, as herein set forth, provides an exceedingly simple and useful lifter applicable to the handles of different cooking utensils, whether they be of the straight rod-like character or in the form of a swinging bail.

Changes in the form, proportion, and minor details may be made without departing from the spirit and scope or sacrificing any of the advantages of my improvements, and therefore I do not wish to be understood as limiting myself to the precise construction and arrangement as herein set forth.

Having thus described the invention, what is claimed as new, and desired to be secured by Letters Patent, is—

1. In a device of the class described, a lid-lifter, having a pair of relatively movable handle-sections of a semitubular form to receive and clamp upon the handle of a cooking utensil, and provided at their contiguous edges with spacing-lugs, to provide a bail receiving and retaining space between the sections when closed, substantially as shown and described.

2. In a device of the class described, the combination with a lid-lifter having a stationary handle and means adapted to engage the lids of a stove, of a movable handle-section hinged to the stationary section at its forward end, the sections being concaved upon their meeting faces and adapted to receive the handle of a cooking utensil therebetween, substantially as shown and described.

3. In a device of the class described, the combination with a lid-lifter having a handle and means adapted to engage the lids of a stove, of a movable handle-section hinged to the forward end of the stationary handle-section, and circumferential lugs formed upon the outer ends of the handle-sections and adapted to space the same apart, substantially as and for the purpose set forth.

4. In a device of the class described, the combination with a lid-lifter having a handle approximately semicircular in cross-section, circumferential lugs at its rear end, and depending flanges at its forward end, and means adapted to engage the lids of a stove, of a movable handle-section having at its forward end a head, the latter being hinged between the flanges of the stationary section, and provided with circumferential lugs at its rear end adapted to engage the lugs of the stationary section, each section being concaved upon its meeting face, substantially as shown and described.

In testimony that I claim the foregoing as my own I have hereto affixed my signature in the presence of two witnesses.

HENRY F. AUSTIN.

Witnesses:
T. A. LANCASTER,
T. B. SMITH.